Nov. 29, 1932.　　　F. V. RUSSELL　　　1,889,297
DRAWBAR FOR VEHICLES
Filed Dec. 29, 1931
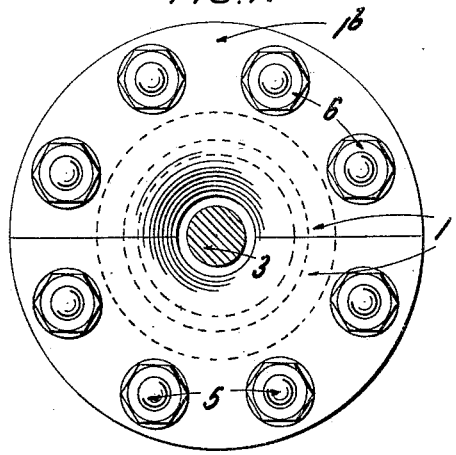
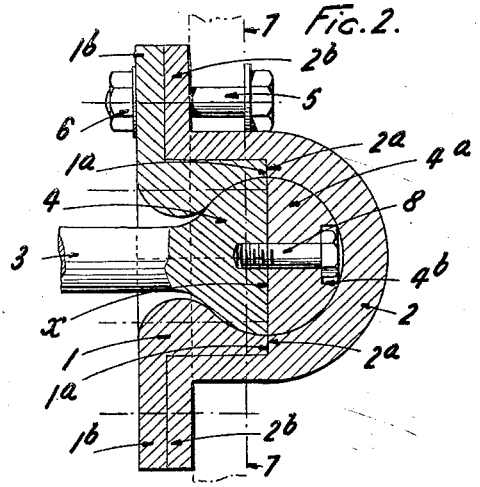
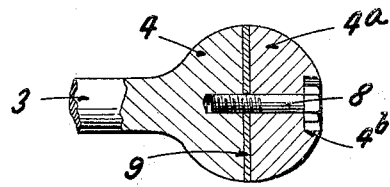
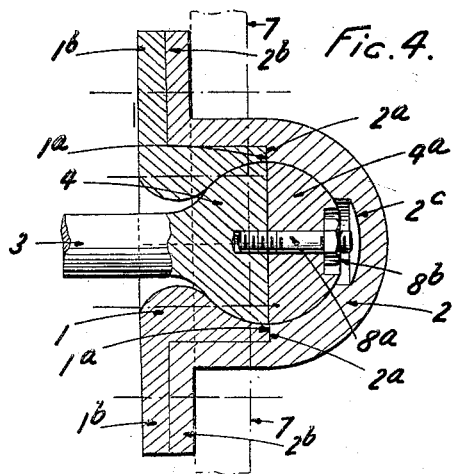
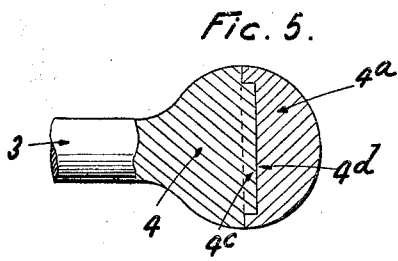
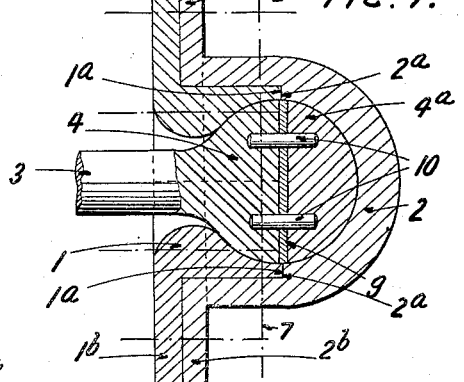
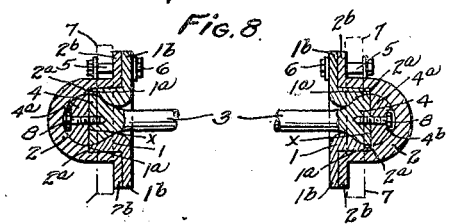
Inventor
Frederick Vernon Russell
By Dowell and Dowell
Attorneys Patented Nov. 29, 1932

1,889,297

UNITED STATES PATENT OFFICE

FREDERICK VERNON RUSSELL, OF LEYTONSTONE, ENGLAND, ASSIGNOR TO THE MONARCH DOOR CONTROLLER COMPANY LIMITED, AND FREDERICK VERNON RUSSELL

DRAWBAR FOR VEHICLES

Application filed December 29, 1931, Serial No. 583,783, and in Great Britain January 24, 1931.

This invention has reference to coupling devices embodying ball and socket joints and suitable for use with vehicles of various kinds, and particularly to draw-bars subject to pulling and pushing stresses and which are provided with ball-shaped or spherical ends adapted to co-act with corresponding sockets connected to the vehicles.

The invention has for its object to provide a coupling device of the kind referred to that can readily be mounted in position for use and which can readily be adapted to compensate for wear.

For this purpose, in a coupling device according to the present invention, the ball-shaped ends of the pull and push device (hereinafter called the draw-bar), are mounted in divided sockets adapted to be secured to drag plates or other parts of the vehicle to be connected together, and each of which is divided in a direction at right angles to the length of the draw-bar and adapted to admit of a liner or equivalent means being inserted between its parts when it becomes necessary to compensate for wear of the ball and socket.

A coupling device embodying the invention can be constructed in various ways.

In the accompanying illustrative drawing, Fig. 1 shows partly in cross section and partly in end elevation, and Fig. 2 partly in side elevation and partly in longitudinal section, one construction of socket with draw-bar according to the invention. Figs. 3, 4, 5, 6 and 7 show in longitudinal section five constructions of the divided ball-shaped end of a draw-bar for use with a socket of the kind shown in Figs. 1 and 2. Fig. 8 shows to a smaller scale than the other figures, a complete draw bar according to the invention.

Referring to Figs. 1 and 2 of the drawing, each socket is made in two main parts 1 and 2, one of which, namely 1, (hereinafter called for distinction the outer part) is made in two portions to admit of its being placed freely around the draw-bar 3 and allow of limited articulation of the bar in the socket and to fit closely a portion 4 of the ball-shaped end 4, $4^a$ thereof. The other main part 2 of the socket (hereinafter called for distinction the inner part) is adapted to fit closely the remaining portion $4^a$ of the ball-shaped end of the draw-bar 3 and also the outer part 1 of the socket, which is of cylindrical shape externally and is adapted at its inner end $1^a$ to bear against a shoulder $2^a$ in the inner part 2, the two parts of the socket being adapted, as by means of flanges $1^b$ and $2^b$, and bolts and nuts 5 and 6, to be secured together and to the draw plate 7 or equivalent part of a vehicle or other body.

Each ball-shaped end of the draw-bar 3 is divided in a transverse plane passing through its centre, as indicated at $x$, into two parts 4, $4^a$ that are secured together by a set screw 8 passing through the part $4^a$ and screwed into the other part 4. By this means, after removing the inner part 2 of the socket from the outer part 1 and withdrawing the set screw 8, the part $4^a$ of the ball can, when necessary, be removed from the other to enable a metal liner 9 (Fig. 3) of suitable thickness to compensate for wear, to be inserted between the two parts 4, $4^a$ of the ball, after which these parts and the liner can be secured together by reinserting the set screw, which also passes through the liner and positions it, and the inner part 2 of the socket replaced. The removable part $4^a$ of the ball-shaped end of the bar may be recessed axially at its outer side, as shown at $4^b$, to receive the head of the set screw.

Instead of a set screw, there may be used, as shown in Fig. 4, a stud $8^a$ that is screwed centrally into the part 4 of the ball and extends freely through the other part $4^a$ of the ball and is fitted with a nut $8^b$ located in the recess $4^b$ in the said part $4^a$. If the outer end of the stud should project slightly from the outer surface of the part $4^a$ of the ball, the adjacent inner side of the inner part 2 of the socket may be recessed, as shown at $2^c$, to enable the ball to move freely in the socket.

According to the modification shown in Fig. 5, one part, namely 4 of each of the divided ball-shaped ends of the draw-bar, is provided with a cylindrical projection $4^e$ adapted to fit into a corresponding recess $4^d$ in the other part $4^a$ of the ball, the adjacent surrounding surfaces of the two parts of the ball being flat and annular and originally fitting against each other and being in a transverse plane passing through the centre of the ball. The arrangement is such that after removing the inner part 2 of the socket from the outer part 1, the part 4ª of the ball-shaped end of the draw-bar can be removed from the other part 4, a metal liner of suitable thickness inserted in the recess 4ᵈ in the part 4ª, the two parts again fitted together and the inner part 2 of the socket replaced and fixed to the outer part 1. The recess 4ᵈ should be of large diameter because, when a liner is inserted therein, the latter will have to take all the push of the draw bar. In this case, a set screw for connecting the two parts of the ball-shaped end of the draw bar and positioning the liner can be dispensed with, as the recess 4ᵈ in the part 4ª will act to hold the liner properly in position. A set screw 8 may however be used, as shown in Fig. 6, which also shows a liner 9 arranged between the projection 4ᶜ and the inner end of the recess 4ᵈ, and also a supplementary liner 9ª, in the form of an annular ring, arranged between the adjacent outer annular surfaces of the parts 4 and 4ª of the ball.

In the further modification shown in Fig. 7, the ball-shaped end of the draw-bar 3 is divided into two parts 4, 4ª held in position laterally by pins 10 fixed in one part 4 and extending freely into holes in the other part 4ª. In this case, when it is necessary to compensate for wear, a liner 9 of the suitable thickness and of the same diameter as the ball-shaped end of the draw-bar, can, as shown, be inserted between the two parts 4, 4ª, the pins 10 extending through holes formed in the liner to hold the latter in position transversely.

What I claim is:—

1. A coupling device of the kind referred to, comprising a draw-bar having ball shaped ends each divided in a direction at right angles to the length of said draw-bar and divided sockets in which said divided ball-shaped ends are fitted so as to be embraced closely and directly thereby and permit of swivelling motion between them, said sockets being adapted externally to be attached to vehicles to be coupled.

2. In a coupling device according to claim 1, means adapted to hold the parts of each divided ball-shaped end of the draw-bar in position relatively to one another in a lateral direction.

3. A coupling device of the kind referred to, comprising a draw-bar having ball-shaped ends each divided in a direction at right angles to the length of said draw-bar, and sockets fitting said ball-shaped ends of the draw-bar and adapted for attachment to two vehicles to be coupled together, each of said sockets comprising two main parts one of which parts comprises two portions adapted to freely surround said draw-bar and to fit a portion of the corresponding ball-shaped end of the said bar and the other of said parts being adapted to fit closely the remaining portion of said ball-shaped end and a portion of the first mentioned main part of said socket.

4. A coupling device of the kind referred to, comprising a draw-bar having ball-shaped ends each divided in a direction at right angles to the length of said draw-bar, divided sockets in which said divided ball-shaped ends are mounted to swivel and which are adapted to be attached to vehicles to be coupled, and screw fastening means for holding the parts of each of said divided ball-shaped ends in position.

5. A coupling device of the kind referred to, comprising a draw-bar having ball-shaped ends each divided in a direction at right angles to the length of said draw-bar, sockets fitting said ball-shaped ends of the draw-bar and adapted for attachment to two vehicles to be coupled together, one portion of each of said divided ball-shaped ends having a cylindrical projection and the other portion of said divided ball-shaped end having a recess adapted to receive the said projection, the adjacent surrounding surfaces of the two parts of the divided ball-shaped end being flat and annular and originally fitting against each other.

6. A coupling device of the kind referred to, comprising a draw-bar having ball-shaped ends each divided in a direction at right angles to the length of said draw-bar, sockets fitting said ball-shaped ends of the draw-bar and adapted for attachment to two vehicles to be coupled together, and pins extending into the two parts of each divided ball-shaped end and adapted to hold such parts in position transversely, the said parts originally fitting against each other.

7. A coupling device comprising a draw-bar having ball-shaped ends each divided in a direction at right angles to the length of the draw-bar into two parts between which a liner can be inserted for the purpose set forth, and sockets fitting the said divided ends of the draw-bar, each socket comprising two main parts, one of which is divided, in a plane containing the axis of the draw-bar, into two portions and freely surrounds the draw-bar, fits closely against the adjacent portion of the corresponding ball-shaped end of the draw-bar, has a cylindrical shaped inner end portion and at its outer end, an outwardly extending flange, and the other part of the said socket fits closely the remaining portion of the ball-shaped end of draw-bar and also the cylindrical portion of the first mentioned part of the socket and has an outwardly extending flange, the two flanges being adapted to be connected together and to a vehicle.

8. A coupling device of the kind referred to, comprising a draw-bar having ball-shaped ends each divided in a direction at right angles to the length of said draw-bar, divided sockets in which said divided ball-shaped ends are mounted to swivel and which are adapted to be attached to vehicles to be coupled, and a liner between the parts of each divided ball-shaped end to compensate for wear of the said ends of the draw-bar and sockets.

Signed at London, England, this 4th day of December 1931.

FREDERICK VERNON RUSSELL.